(12) United States Patent
Kubota

(10) Patent No.: US 7,107,149 B2
(45) Date of Patent: Sep. 12, 2006

(54) POSITION INFORMATION PRESENTATION DEVICE, POSITION INFORMATION PRESENTATION METHOD AND PROGRAM TO PRESENT POSITION INFORMATION

(75) Inventor: Hiroaki Kubota, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 296 days.

(21) Appl. No.: 10/234,112

(22) Filed: Sep. 5, 2002

(65) Prior Publication Data

US 2003/0055716 A1 Mar. 20, 2003

(30) Foreign Application Priority Data

Sep. 19, 2001 (JP) ............... 2001-284317

(51) Int. Cl.
G01C 21/30 (2006.01)
(52) U.S. Cl. ............ 701/208; 701/207; 701/209; 701/211; 342/357.01
(58) Field of Classification Search ............ 701/208, 701/207, 209, 210, 211; 455/456.1, 456.2, 455/456.3, 456.5, 456.6; 342/357.01, 357.06, 342/357.1
See application file for complete search history.

(56) References Cited

U.S. PATENT DOCUMENTS

| | | | |
|---|---|---|---|
| 5,797,091 A | | 8/1998 | Clise et al. |
| 6,166,698 A | | 12/2000 | Turnbull et al. |
| 6,542,814 B1 | * | 4/2003 | Polidi et al. ............ 701/208 |
| 6,594,581 B1 | * | 7/2003 | Matsuda et al. ........ 701/211 |
| 6,622,089 B1 | * | 9/2003 | Hasegawa et al. ...... 701/211 |
| 6,629,034 B1 | * | 9/2003 | Kozak et al. ............ 701/200 |
| RE38,267 E | * | 10/2003 | Borkowski et al. ...... 455/456.1 |
| 2003/0036848 A1 | * | 2/2003 | Sheha et al. ............ 701/209 |
| 2003/0069693 A1 | * | 4/2003 | Snapp et al. ............ 701/213 |

FOREIGN PATENT DOCUMENTS

| | | |
|---|---|---|
| CN | 1284679 A | 2/2001 |
| EP | 1 132 713 A1 | 9/2001 |
| JP | 10-31682 | 2/1998 |
| JP | 10-031682 | 2/1998 |
| JP | 2001-059740 | 3/2001 |
| KR | 1020000058311 A | 5/2000 |

OTHER PUBLICATIONS

Toshiba Review, vol. 55, No. 10, Tanigawa, Kubota & Hasegawa, pp. 24-28, "User-Friendly Route Guidance Interface for Internet-Based Information Service," Oct., 2000.

(Continued)

Primary Examiner—Gertrude A. Jeanglaude

(57) ABSTRACT

A position information presentation device comprises a position information acquisition part which acquires position information indicated by a latitude and longitude or an address on a portable terminal, an information inspection part which retrieves inspected information, and to present information in which inspection is requested for the portable terminal, a position associated information memory part which memorize a title or a content of information presented by the information inspection part as a position associated information by associating with the acquired position information, a position associated information readout part which reads the position associated information corresponding to information which should be presented from the memorized position associated information as a key of the title or the content of the information, and a position associated information presentation part which presents position information which is included in the read position associated information as map information.

21 Claims, 11 Drawing Sheets

OTHER PUBLICATIONS

Toshiba Review, vol. 56, No. 12, Koyama, Tanigawa & Miki, pp. 10-15, "Route Guidance Map Services with Point of Interest Information," Dec., 2001.

Tamotsu Hasegawa, et al., "Route Guidance Apparatus and Method," U.S. Appl. No. 10/083,538, filed Feb. 27, 2002.

Mieko Matsuda, et al., "Route Guidance Apparatus and Method," U.S. Appl. No. 10/083,367, filed Feb. 27, 2002.

Office Action and English translation from the Korean Patent Office.

Search and Examination Report from Austrian Patent Office, Service and Information Sector (TRF), mailed Jul. 30, 2004.

* cited by examiner

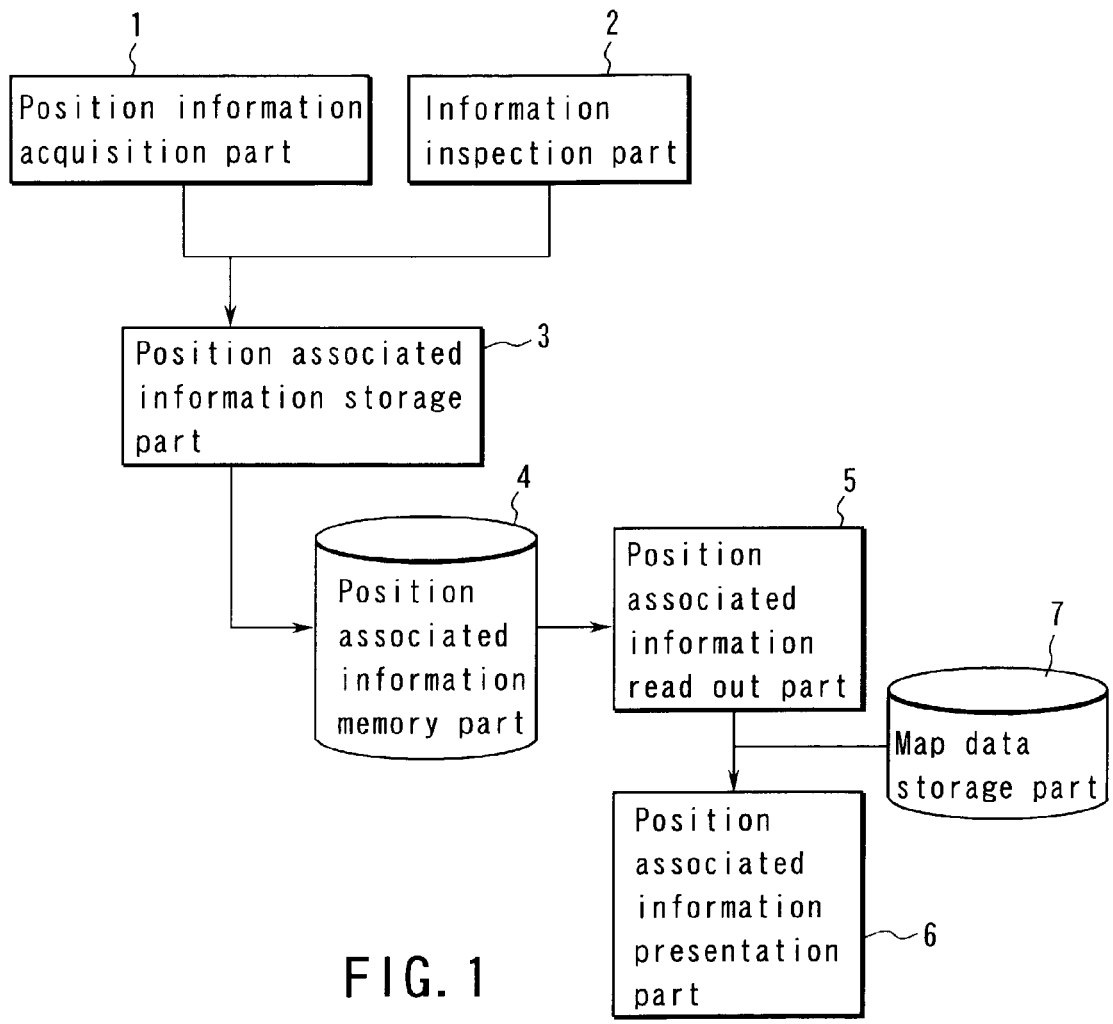

● : Position where Brassery is accessed

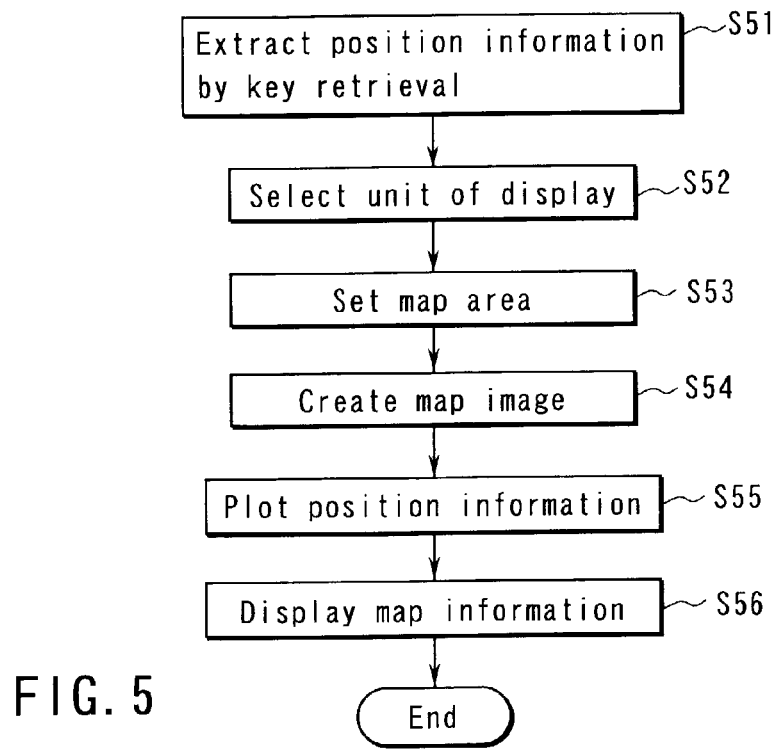
FIG. 5
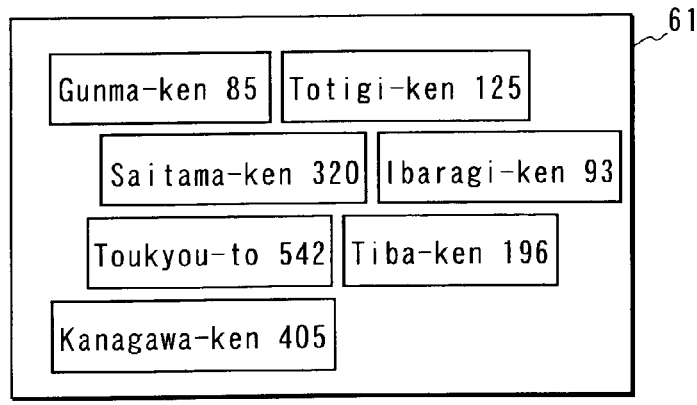
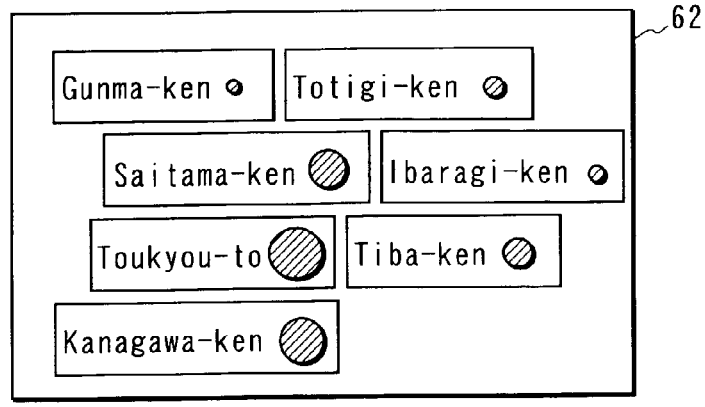
FIG. 6

| 81 | 82 | 83 | 84 | 85 | |
|---|---|---|---|---|---|
| Fri. 16:30 | Brassery at front shop of station | 35.39.21.66 | 139.42.43.12 | 25 | F. |
| Fri. 16:42 | Brassery second shop | 35.39.24.33 | 139.42.43.16 | 28 | M. |
| Fri. 16:43 | Restaurante 55 | 35.39.29.86 | 139.42.20.75 | 28 | M. |
| Fri. 16:50 | Brassery second shop | 35.39.29.89 | 139.42.26.72 | 22 | F. |
| ... | ... | ... | ... | ... | ... |
| Sat. 12:15 | Brassery second shop | 35.39.26.67 | 139.42.27.32 | 29 | F. |

86-1, 86-2, 86-3, 86-4, ... 86-n

POSITION INFORMATION PRESENTATION DEVICE, POSITION INFORMATION PRESENTATION METHOD AND PROGRAM TO PRESENT POSITION INFORMATION

CROSS-REFERENCE TO RELATED APPLICATIONS

This application is based upon and claims the benefit of priority from the prior Japanese Patent Application No. 2001-284317, filed Sep. 19, 2001, the entire contents of which are incorporated herein by reference.

BACKGROUND OF THE INVENTION

1. Field of the Invention

The present invention relates to a position information presentation device used by an information provider who provides application/service which can be executed by a portable computer and a mobile phone and to a processing thereof.

2. Description of the Related Art

Recently, information retrieval chance in mobile environments such as a portable computer and a mobile phone has increased. Then, the user can retrieve and inspect get necessary information while moving. In the application providing data which is retrieved and inspected like this and t The information provider, who provides applications or services which a user can retrieve and browse the information, takes a method that by using a history with the information such as the user's ID and time zone, the information is associated with the user's individual information in order to analyze an access for the information, a method of taking the history with the information and the user's ID who retrieves and inspects the information, and the time zone of the retrieval and inspection etc., and analyzing them by associating with user's individual information is adopted.

There is a mechanism such that whether the provided information is profitable for the user is fed back from the user and the information is stored accumulated as a history. As a result, it can be judged whether the provided information is profitable for the user or not.

BRIEF SUMMARY OF THE INVENTION

However, in the history information obtained by a conventional mechanism, it cannot be confirmed what information the user needs in which place from the information provider side. The present invention provides a position information presentation technology in which the provider about the application and service of information retrieval and inspection which can be executed with a portable computer and a mobile phone can confirm what information the user needs in which place, by using position information obtained with GPS and a mobile phone.

A position information presentation device according to the first aspect of the present invention is characterized by comprising: a position information acquisition part configured to acquire position information indicated by a latitude and longitude or an address on a portable terminal; an information inspection part configured to retrieve inspected information, and to present information in which inspection is requested for the portable terminal; a position associated information memory part configured to associate with the position information acquired by the position information acquisition part and memorizes a title or a content of information presented by the information inspection part as a position associated information; a position associated information readout part configured to read the position associated information corresponding to information which should be presented from the position associated information memorized in the position associated information memory part as a key of the title or the content of the information; and a position associated information presentation part configured to present position information which is included in the position associated information read by the position associated information readout part includes as map information.

It becomes possible to immediately understand that information is requested to inspect is requested at which place. And, an excellent effect of being expected that there is a large effect in the advertisement plan and the branch shop plan, etc. in the place can be achieved.

A position information presentation device according to the second aspect of the present invention is characterized by further comprising a position associated information conversion part configured to convert position information included in the position associated information read by the position associated information readout part into a conversion value according to a selected predetermined index, and the position associated information presentation part presents the conversion value of the position information converted by the position associated information conversion part as map information.

By converting the point to which information is inspected into the distance from the nearest station, the situation when information that the inspection is requested is drawn out can be grasped. And, an excellent effect of being expected that there is a large effect in the advertisement plan, the branch shop plan in the place, and the signboard installation plan of the guide etc. can be achieved.

In the position information presentation device according to the third aspect of the present invention is characterized by further comprising a search part configured to search path information at a point which becomes destination from position information which is included in the position associated information read by the position associated information readout part referring to map information, and the position associated information presentation part presents the path information searched by the search part.

It can be understood for the user how to whether the requester of the inspection often arrive at the destination through which place. An excellent effect of being expected that there is a large effect in the advertisement plan and the branch shop plan, etc. can be achieved by them.

A position information presentation device according to the fourth aspect of the present invention is characterized by comprising: a position information acquisition part configured to acquire position information indicated by a latitude and longitude or an address on a portable terminal; an information inspection part configured to retrieve inspected information, and to present information in which inspection is requested for the portable terminal; a history information memory part configured to memorize a title or a content of information presented by the information inspection part as history information by associating with position information acquired by the position information acquisition part; a history information readout part configured to read the history information corresponding to information which should be presented from the history information memorized in the history information memory part as a key of the title or the content of the information; and a presentation part configured to present position information which is included in the history information read by the history information readout part, and user's situation corresponding to the position information, as map information.

The provider can become to know in what situation the information that the inspection is requested is necessary. And, an excellent effect of being expected that there is a large effect in the advertisement plan and the branch shop plan, etc. in the place can be achieved.

BRIEF DESCRIPTION OF THE SEVERAL VIEWS OF THE DRAWING

FIG. 1 is a configuration figure of the position information presentation device according to the first embodiment of the present invention;

FIG. 2 is an explanation figure of the information associated with position associated information of the position information presentation device according to the first embodiment of the present invention;

FIG. 5 is a flowchart which shows the processing procedure in the second embodiment of the position information presentation device of the present invention;

FIG. 6 is an explanation figure of the screen display in the position information presentation device according to the second embodiment of the present invention;

DETAILED DESCRIPTION OF THE INVENTION

Figure 3:
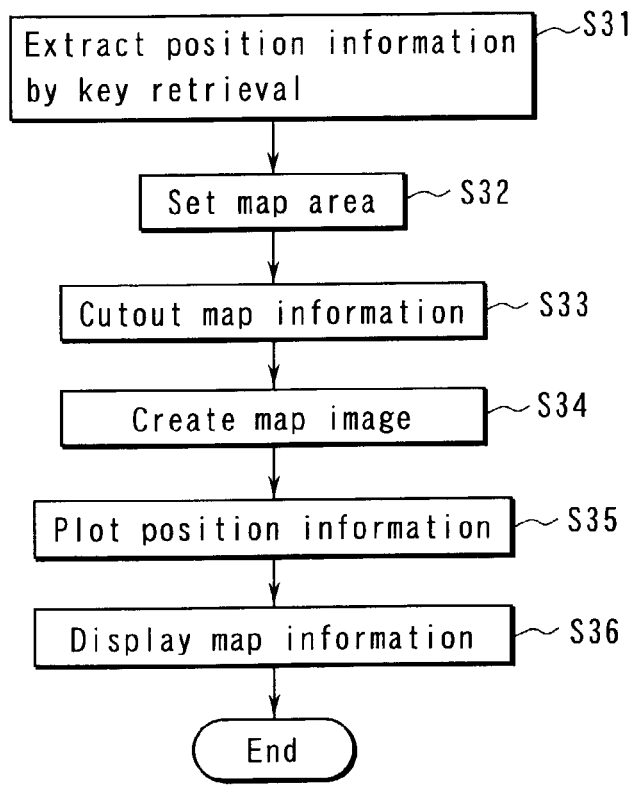
FIG. 3 is a flowchart which shows the processing procedure in the position information presentation device according to the first embodiment of the present invention.

Hereinafter, embodiments of the invention will be explained referring to the drawings.

FIG. 1 is a figure which shows an outline configuration of the position information presentation device according to the first embodiment of the present invention. The position information presentation device memorizes the positional information on the retrieval of information and the place where the information is inspected by associating it with the corresponding information, and presents to the information provider what place the information is inspected.

The position information presentation device shown in FIG. 1 has a position information acquisition part 1, an information inspection part 2, a position associated information storage part 3, a position associated information memory part 4, a position associated information readout part 5, a position associated information presentation part 6, and a map data memory part 7.

The position information acquisition part 1 uses a global positioning system (GPS) connected with the mobile terminals such as personal digital assistants (PDA) and mobile portable telephones, position information service by base station information on a mobile portable telephone and PHS or beacon (beacon), etc. buried under the road and each facilities, etc. such as a radio beacon which buried under the road, and acquires the position information which includes the latitude and longitude which are in is obtained from the data information obtained from them. The address information data is converted into the latitude and longitude from by using the database with which the latitude and longitude is associated, and is inputs as a latitude and longitude when the address information data is obtained as the position information.

The information inspection part 2 retrieves the information according to the retrieval request and the inspection request of information from the user's mobile terminal. And, the retrieved information and stored information are transmitted sent to the mobile terminal, and displayed on the portable terminal. These information of the displayed inspection target contains all information any categories, such as which are the shop information, the facilities information, the departure starting time and, the transfer information of the trains, the stock prices, and the results of sports etc.

The position associated information storage part 3 associates with position information obtained by the position information acquisition part 1 at point where information is retrieved by the information inspection part 2 and the position information at point where the stored information is inspected by being accessed by the portable terminal, and stores the title of the corresponding inspected information or the contents in the position associated information memory part 4 as the position associated information.

The position associated information readout part 5 performs retrieval retrieve from the position associated information stored in the position associated information memory part 4 according to the title or the content, and reads the position information associated therewith.

The position associated information presentation part 6 presents the position information associated with the information read by the position information readout part 5 by overlapping the map or the diagram stored in the map data memory part 7, etc. as two-dimensional information.

The map data memory part 7 memorizes the information relating to the map information (or, geographic information) of the as the data etc. used to draw the map image in the position associated information presentation part 6. As a result, it becomes possible to acquire the place where one information is actually retrieved and inspected according to position information, and display it on the map.

Hereinafter, the position information presentation device according to the first embodiment of the present invention will be explained as an example of service providing the shop information in the neighborhood region. FIG. 2 is a figure which shows an example of the position associated information stored in the position associated information memory part 4. In this information providing service, it is assumed that the shop information in the region neighborhood can be drawn out extracted by retrieval, and when the information on each shop is inspected, a present position can be acquired by the position acquisition part such as the GPS equipped in the mobile terminal in the latitude and longitude and the shop name and latitude and longitude information can be associated with each other.

As shown in FIG. 2, the set of the shop name 21, the latitude 22, and the longitude 23 is stored in the position associated information memory part 4 as one record. This storage processing is assumed to be performed continuously for a certain period. Thereby, data having a lot of records 24-1 to 24-n are accumulated stored in the position associated information storage part 4.

FIG. 3 is a flowchart which shows the processing procedure which reads the data accumulated stored in the position associated information memory part 4, and presents it as a map.

First of all, the shop name is used as a retrieval key and the retrieval is performed to the data stored in the position associated information storage part 4, and the record coincided with included the name input as a key is extracted (step S31). For instance, when "Brassery" is input to the data of FIG. 2 as the retrieval key, the record 24-1, the record 24-2, the record 24-4, . . . , and the record 24-n are extracted.

Next, the latitude and longitude information is taken out of the record extracted by the retrieval processing in step S31, and a necessary map area is set from the latitude and longitude information (step S32). For instance, the east edge, the west edge, the south end, and the north end of the taken out latitude and longitude information are calculated here and the map area is set. It is also possible to set the map area by ignoring the position information extremely far away among extracted position information. Regardless of the stored information, the map area may be set in the area with a certain constant standard such as the area of 1 km in surroundings in the corresponding target shop or the area in which the shop is centered on the nearest station etc. In that case, it is also possible that the user properly sets the area.

Next, the map information data which corresponds to the set area is read by using the method such as cutting out it from the map data memory part 7 on reception of according to the result of setting the map area (step S33). Next, the map image is generated based on the read map information (step S34). And, coordinates in the image are calculated, and the latitude and longitude information corresponding to position information is plotted on this image (step S35). Therefore, the map image including the completed position information is displayed on the screen such as personal computers (Hereafter, it is called "PC") (step S36). Or, the information is transmitted sent to the portable terminal through the network.

Figure 4:
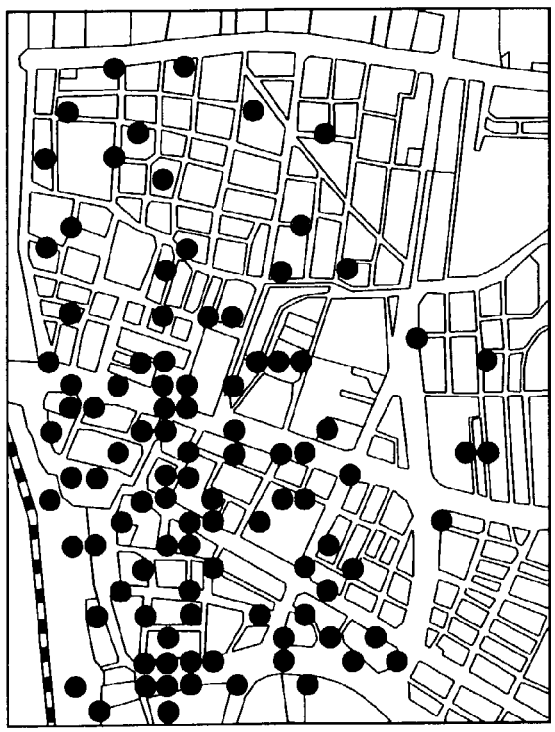
FIG. 4 is an explanation figure of the screen display in the position information presentation device according to the first embodiment of the present invention.

The example of presenting the position associated information as a map is shown in FIG. 4. As for the map information stored in map data storage part 7, the shapes of the road and the building, etc. are managed as vector data. And, the cut out map information is drawn as a map image. The result of converting the latitude and longitude extracted here into coordinates of the image and plotting it is shown in the display screen of FIG. 4. It becomes possible to display, for instance, the place where information on the shop was inspected, as the map as mentioned above.

Next, the position information presentation device according to the second embodiment of the present invention will be explained. Though the configuration to achieve the second embodiment is the same as the first embodiment, the latitude and longitude information is not plotted to the map of two-dimensional simply, but is plotted by dividing into a certain area.

Hereinafter, it will be explained by using the flowchart which shows the processing procedure in the second embodiment of FIG. 5. First of all, the shop name is used as a retrieval key and the retrieval is performed to the data stored in the position associated information storage part 4, and the record coincided with included the name input as a key is extracted (step S51).

Next, the unit of the display of the extracted latitude and longitude information is selected (step S52). As the display form, the retrieved place for each area is counted, for instance, and the method of displaying the count value is adopted. The unit of the area is a unit of the prefecture and, for instance, a unit of the municipal district town and village. Moreover, the method of setting the area of each station in the surrounding, and displaying the count value of each station is acceptable.

Next, the map area is set according to the selected unit of the display and the extracted latitude and longitude information (step S53), and the map image is generated (step S54). And, the extracted latitude and longitude information is distributed to each area, and the number is counted. And, the counted value is drawn as the map or the graph (step S55). Therefore, the completed image is displayed on the screen such as PC (step S56). Or, the information is transmitted sent to a portable terminal through the network.

FIG. 6 is a display example of the output screen of the counted value for each area according to the second embodiment. By the display shown in FIG. 6, it comes in one glance how many accesses from which administrative divisions area are performed for a certain inspection target data. At this time, each point of places where a certain data the retrieved or inspected is not plotted on the map, but the numerical value which is totaled for each area divided by the administration ve field district may be displayed like the display screen 61.

When it is difficult to understand the analyzed result by forecast that neither the scale nor a relative grasp can be smoothly done in the numerical value, to correspond to this, the count result may be displayed according to the numerical value as a size and a different symbol according to the numerical value like display screen 62. At this time, by presenting each area indicating each administrative districts divisions while keeping a relative position relation, it become easy to understand the understanding degree of the output result can be improved.

Figures 7, 8:
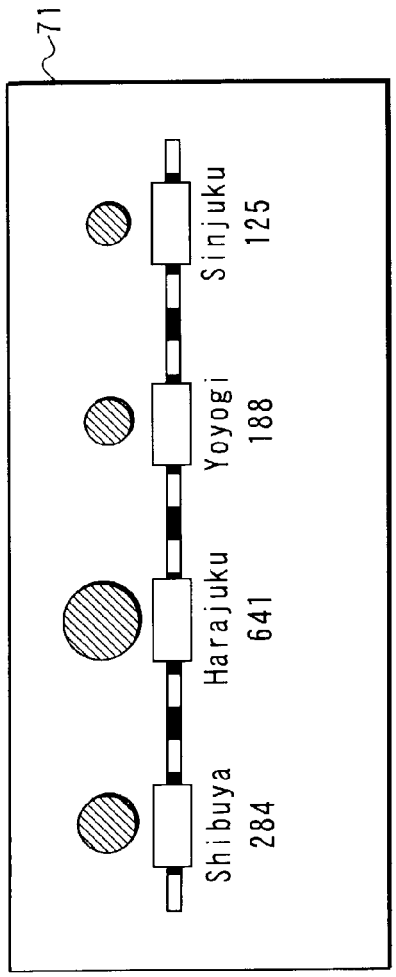
FIG. 7 is an explanation figure of the screen display in the position information presentation device according to the second embodiment of the present invention.
FIG. 8 is an explanation figure of the screen display in the position information presentation device according to the third embodiment of the present invention.

FIG. 7 is an example of another display screen output according to the second embodiment. FIG. 7 shows how many access are performed from which station surrounding for a certain inspection target data. At this time, each point of places where a certain data the retrieved or inspected is not plotted on the map, but an area each station peripheral is set beforehand as shown on display screen 71, and it is possible to display it by using the symbol which changes the size and the type according to the numerical value which is totaled for the set area. At this time, by presenting each area which shows each station while keeping a relative connected relation, it become easy to understand the understanding degree of the output result can be improved as well as the case of FIG. 6.

Next, the position information presentation device according to the third embodiment of the present invention will be explained. The configuration of the position information presentation device according to the third embodiment is the same as that of the first embodiment. In the third embodiment, by using additional information data of the retrieval and inspection of when certain information is inspected or retrieved, is used and the accessed situation is analyzed in detail.

FIG. 8 is a figure which shows the position associated information stored in the position associated information storage part 4 in the third embodiment. In the service which provides the shop information, when the information on each shop is retrieved or inspected, a present position is acquired by the position acquisition part such as the GPS equipped in the mobile terminal in the latitude longitude, and is memorized by relating to the accessed shop name.

In FIG. 8, as a position associated information, the date 81 when information was inspected and service and the information 85 on the person who receives the information, that is, the person who inspects the information with shop name 82, latitude 83, and longitude 84 is stored as one record. By performing continuously the series of storage processing for a certain period, a lot of records of 86-1 to 86-n are stored in the position associated information memory part 4.

Figure 9:
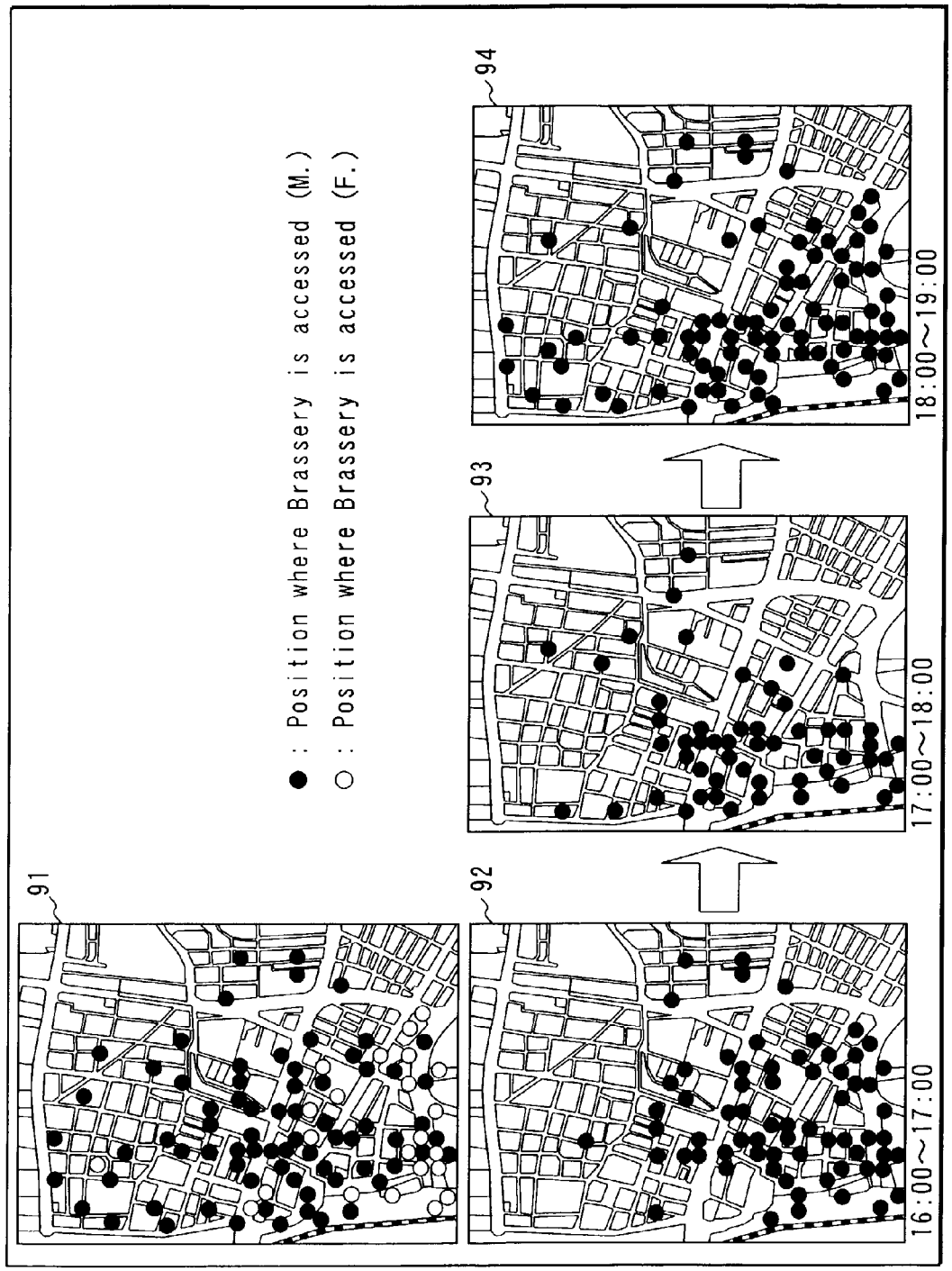
FIG. 9 is an explanation figure of the screen display in the position information presentation device according to the third embodiment of the present invention.

FIG. 9 is an example of the output with the position information presentation device in the third embodiment based on such a position associated information. For instance, In a word, according to not only the latitude and longitude which is position information but also the accessed time and user's sex according to the male and female is made a retrieval key and the record is extracted according to shown in FIG. 9. Concretely, it is as follows.

The display screen 91 is an example of extracting and displaying the distribution of the place accessed according to the male and female for a certain data. Display screens 92 to 94 continuously display the plotting result of the distribution of the place accessed in every one hour to understand the change in the access distribution by time in a separate image. As a result, it becomes easy to understand the distribution of the access place according to the male and female by time and the change in the access distribution.

Figure 10:
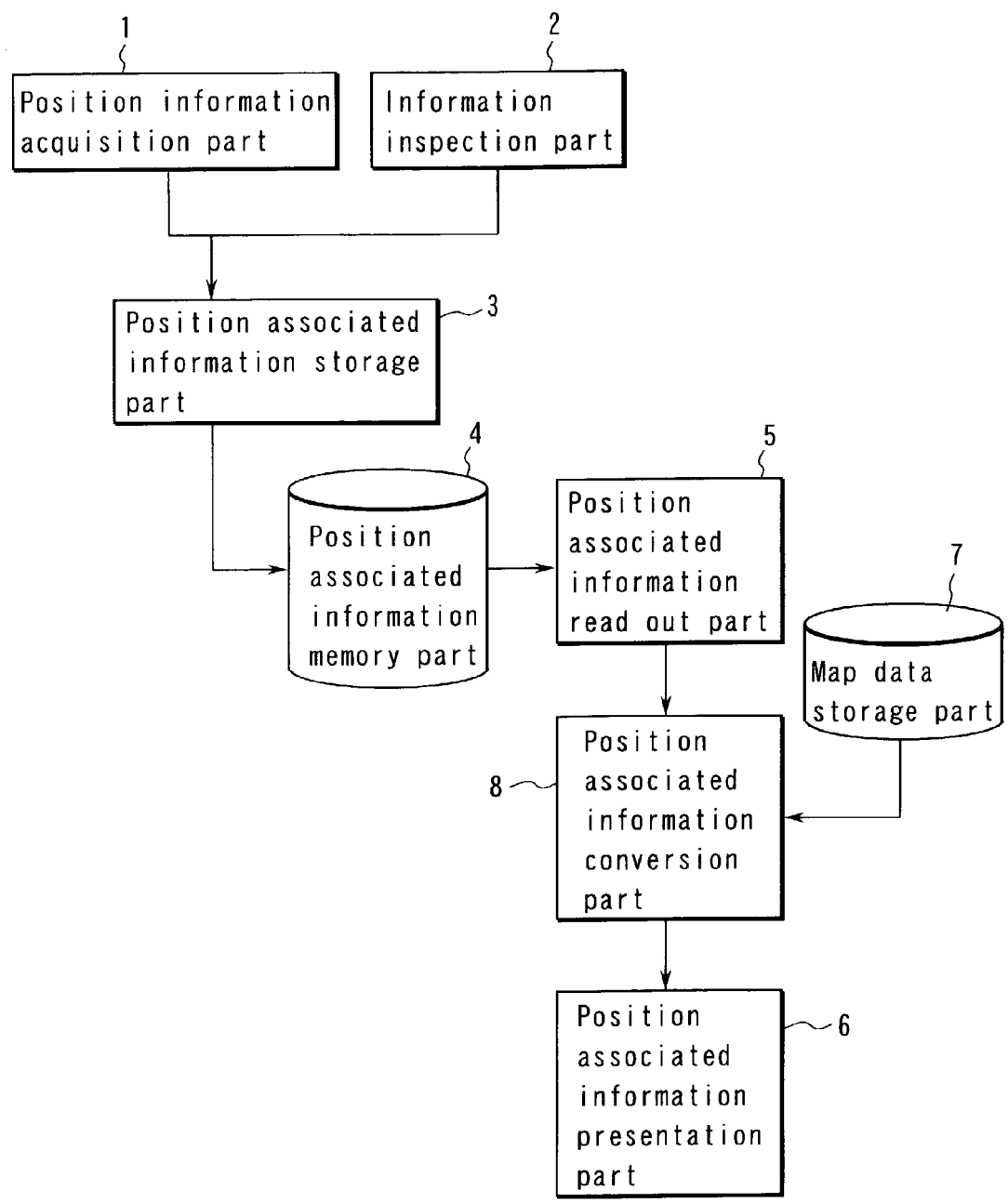
FIG. 10 is a configuration figure of the position information presentation device according to the fourth embodiment of the present invention.

Next, the position information presentation device according to the fourth embodiment of the present invention will be explained. FIG. 10 is a configuration figure of the position information presentation device according to the fourth embodiment of the present invention. The position information presentation device according to the fourth embodiment simply does not plot the latitude and longitude information which is position information to the map of two-dimensional, but converts into another data according to a certain index and outputs it.

The position information presentation device shown in FIG. 10 has a position information acquisition part 1, an information inspection part 2, a position associated information storage part 3, a position associated information part 4, a position associated information readout part 5, a position associated information presentation part 6, a map data part 7, and a position associated information conversion part 8. The position information acquisition part 1 uses a global positioning system (GPS) connected with the mobile terminals such as personal digital assistants (PDA) and portable telephones, position information service by base station information on a portable mobile telephone and each facilities such as and PHS or radio beacon (beacon), etc. which buried under the road and each facilities, etc., and acquires position information which includes the latitude and longitude is obtained from information obtained from them. When the address information is obtained as position information, the address information is converted into the latitude and longitude from the associating with database which associates the address with the latitude and longitude and is inputs as a latitude and longitude.

The information inspection part 2 transmits sends the information retrieved from the mobile terminal and stored information to the mobile terminal. And, the transmitted sent information is displayed on a portable terminal. The inspection target information to be displayed includes all information which are the shop information, facilities information, the departure starting time, transfer information of the a train, the stock prices, and the results of sports etc.

The position associated information storage part 3 associates with the position information obtained by the position information acquisition part 1 at a point where the information is retrieved in the information inspection part 2 and position information at a point where the stored information is inspected by being accessed by a portable terminal, and stores the title or the contents of inspected corresponding information or the contents in the position associated information memory part 4 as the position associated information.

The position associated information readout part 5 performs retrieval from the position associated information stored in the position associated information memory part 4 according to the title or the content, and reads the position information associated therewith.

The position associated information conversion part 8 converts the position information of by the latitude and longitude read by the position associated information readout part 5 into data with different distance from the station etc. based on a predetermined index. The position associated information presentation part 6 presents the position information as the map and the graph based on the conversion value converted in the position associated information conversion part 8.

The map data memory part 7 memorizes the conversion processing in the position associated information conversion part 8 and the data used to draw the map in the position associated information presentation part 6.

Figure 11:
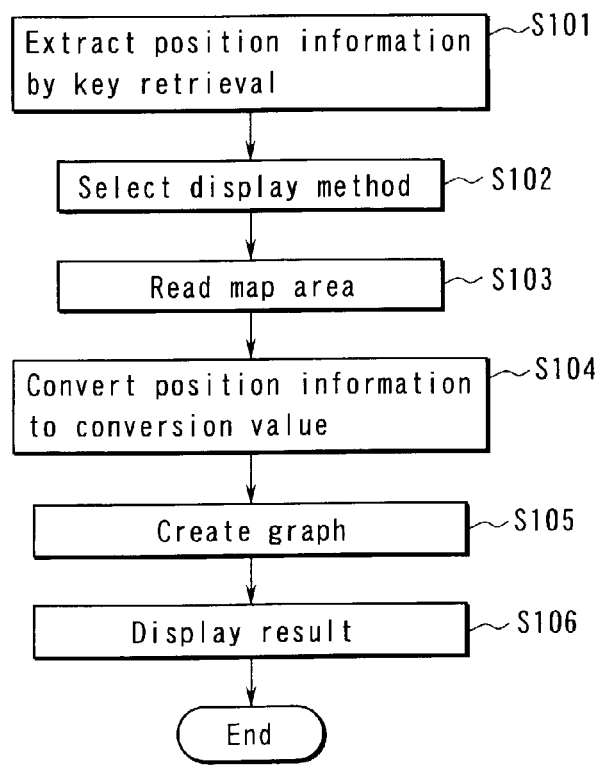
FIG. 11 is a flowchart which shows processing procedure in the fourth embodiment of the position information presentation device of the present invention.

FIG. 11 is a flowchart of the processing procedure in the fourth embodiment. First of all, the shop name is used as a retrieval key and the retrieval is performed to the data stored in the position associated information storage part 4, and the record coincided with included the name input as a key is extracted (step S101).

Next, the display index of the extracted latitude and longitude information is selected (step S102). Here, the display index is a distance from a nearest station of each accessed place point for instance. Moreover, the display index may be a distance from the target shop for inspection, and may be a distance from a certain constant station.

Moreover, the display index may not be not the distance but may be the time required to move the target shop from each place point for inspection.

Next, the geography information necessary for conversion based on the selected display index is read (step S103). For instance, the geography information is f or instance, the latitude and longitude information of the station etc.

Next, the conversion value of the extracted latitude and longitude is calculated according to the selected index (step S104). For instance, the nearest station is searched by first using the latitude and longitude of each place point and the latitude and longitude of the station when the display index is a nearest station of the various place point to the distance. And, the distance to various place point and a nearest station is calculated.

Figure 12:
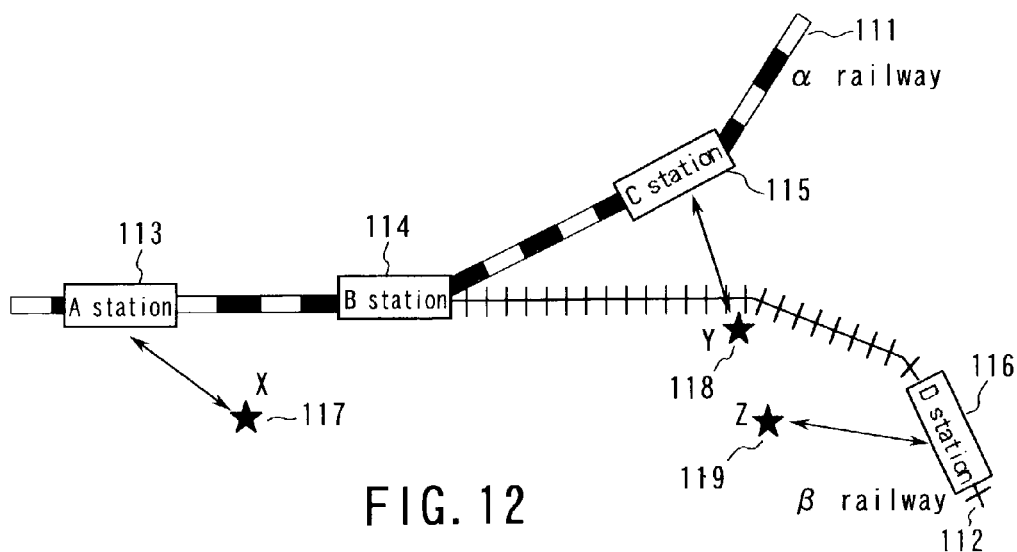
FIG. 12 is an explanation figure of the display screen in the position information presentation device according to the fourth embodiment of the present invention.

For instance, a case where two routes of the α railway 111 and the β railways 112 exist near the inspected point, and the A station 113, the B station 114, the C station 115, and the D station 116 exist as four stations as shown in FIG. 12 is considered. In this case, the A station 113 is the nearest station to the access point XX117, the C station 115 is the nearest station to the access point Y118, and the D station 116 is the nearest station to the access point Y119. And, the distance between each access point and the nearest station is calculated, and the conversion value is obtained.

In this case, the distance between an access point and the nearest station may be a straight line distance or may be walking distance in which the path route by the path route search which is along the road where the pedestrian can walk is considered.

Finally, the converted value is graphed and is drawn (step S105). Therefore, the completed map image which contains position information is displayed on the screen such as PC (step S106). Or, it is delivered to the portable terminal through the network.

Figure 13:
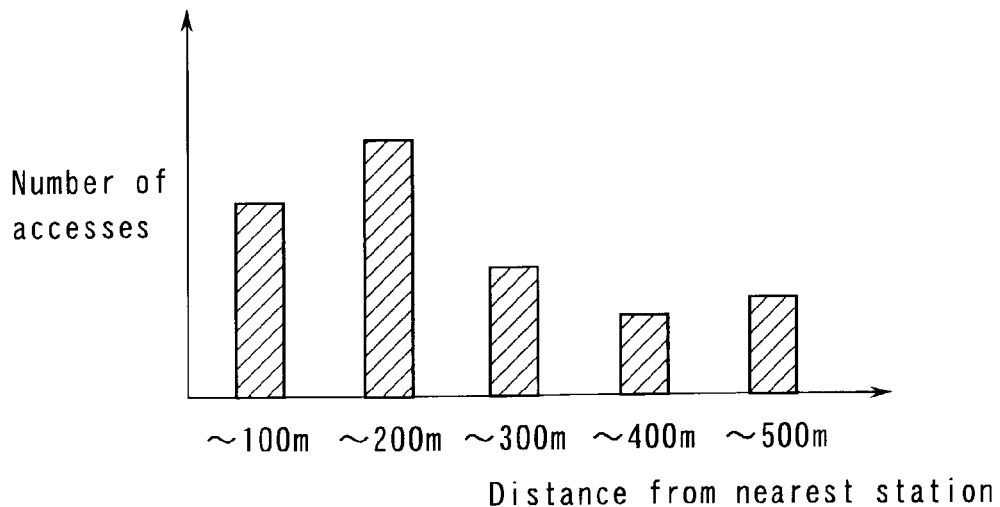
FIG. 13 is an explanation figure of the display screen in the position information presentation device according to the fourth embodiment of the present invention.

FIG. 13 is a display screen of the graph obtained thus. As mentioned above, by converting the point where the certain information is inspected by the inspector into the distance from a nearest station, the situation when information is drawn out can be understood.

Figure 14:
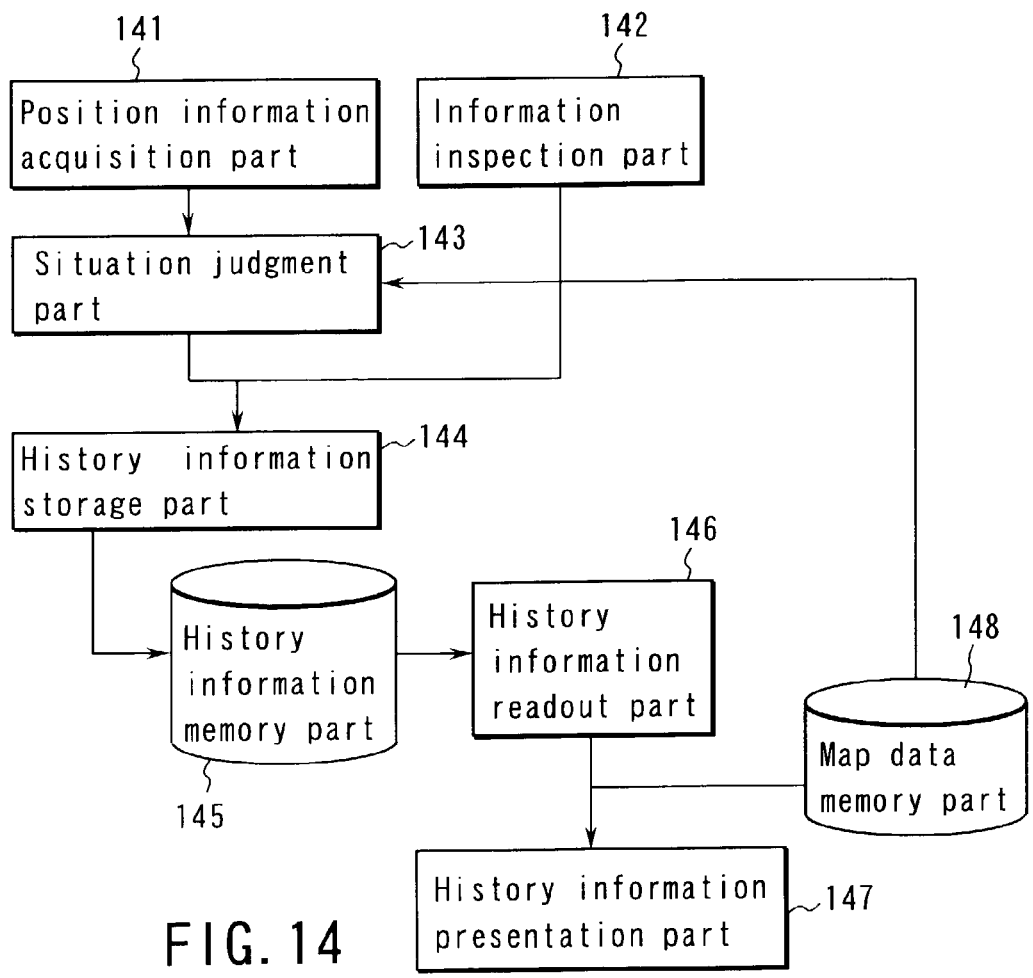
FIG. 14 is a configuration figure of the position information presentation device according to the fifth embodiment of the present invention.

Next, the position information presentation device according to the fifth embodiment of the present invention will be explained. FIG. 14 is a figure which shows an outline configuration of the position information presentation device according to the fifth embodiment of the present invention. The position information presentation device according to the fifth embodiment judges the situation when it is accessed from latitude longitude information on the inspected point, and outputs it based on the situation.

The position information presentation device shown in FIG. 14 has a position information acquisition part 141, an information inspection part 142, a situation judgment part 143, a history information storage part 144, a history information memory part 145, a history information read out part 146, a history information presentation part 147, and a map data storage part 148.

The position information acquisition part 141 uses a global positioning system (GPS) connected with the mobile terminals such as personal digital assistants (PDA) and mobile portable telephones, position information service by base station information on a portable mobile telephone and each facilities such as PHS orardio beacon (beacon), etc. buried under the road and each facilities, etc., and acquires the position information which includes the latitude and longitude is obtained from information obtained from them. The address information is converted into the latitude and longitude from the database with which the latitude and longitude is associated and is inputs as a latitude and longitude when the address information is obtained as the position information.

The information inspection part 142 transmits the information retrieved from the mobile terminal and the stored information to the mobile terminal. And, the transmitted information is displayed on the portable terminal. The information of the displayed inspection target contains all information which are the shop information, the facilities information, the starting time, transferring information of the train, the stock prices, and the results of sports etc.

The situation judgment part 143 judges the user's situation by using the latitude and longitude acquired in the position information acquisition part 141. The history information storage part 144 stores the user's situation at the point where the information is retrieved in the information inspection part 142 or at the point where the stored information is inspected in the history information storage part 145 with the position information in the title of corresponding information or the content and the latitude and longitude, etc. The history information readout part 146 retrieves and reads history information related to the situation of the user stored in history information memory part 145 by the title or the content.

History information presentation part 147 presents the position information associated with the information read by the position information readout part 146 by overlapping the map or the diagram stored in the map data memory part 148, etc. as two-dimensional information, and present the position information in the graph for the user's situation. As a result, it becomes possible to display the point where one certain information is actually retrieved and inspected as the map by classifying it into user's situation.

Here, the method of judging user's situation in situation judgment part 143 will be explained. First of all, the situation judgment part 143 analyzes what situation as user's situation when the user inspects the information which becomes a target. The situation judgment part 143 presumes the place where the user exists referring to the map data memory part 148 from the latitude and longitude acquired by the position information acquisition part 141. Here, if the place where the user exists can for instance be specified that it is an office, a shopping center, a school, and a station, etc., what situation the user is can be narrowed.

Moreover, by acquiring the latitude and longitude acquired in the position information acquisition part 141 two or more times for a predetermined period, it is also possible to presume the movement speed of the user. In addition, by referring with the map data the memory part 148, it can be judged whether to take the train, to take the car, to walk, or to stop. By judging such the user's situation, for instance, it is possible to narrow the purpose to the inspect information that the user becomes the target and detect the level how the user is interested in the information.

In the above-mentioned explanation, it is explained that the situation judgment part 143 operates before the history information storage part 144 stores history information in the history information storage part 145. However, It is also possible to store two or more the latitude and longitude information acquired for instance and judge the user's situation after it is read by the history information read out part 146.

Figure 15:
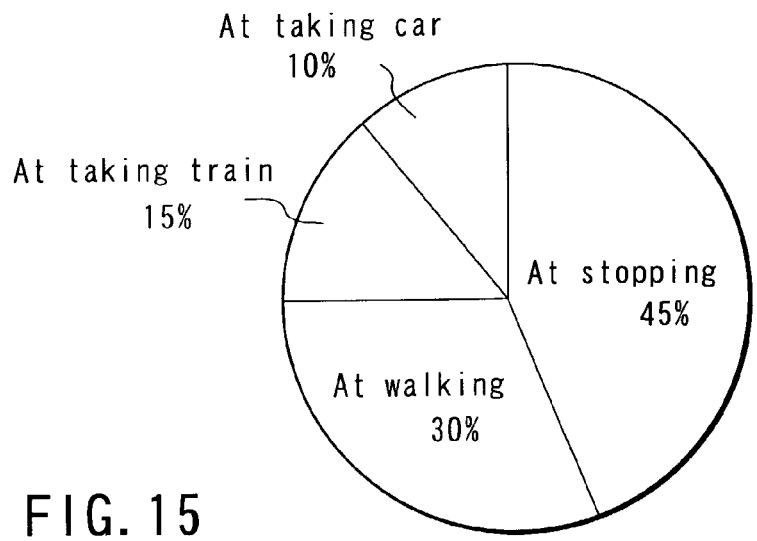
FIG. 15 is an explanation figure of the display screen in the position information presentation device according to the fifth embodiment of the present invention.

FIG. 15 is an example of the output with the position information presentation device in the fifth embodiment. FIG. 15 displays the user's situation by dividing when the information which becomes a target is inspected.

Figure 16:
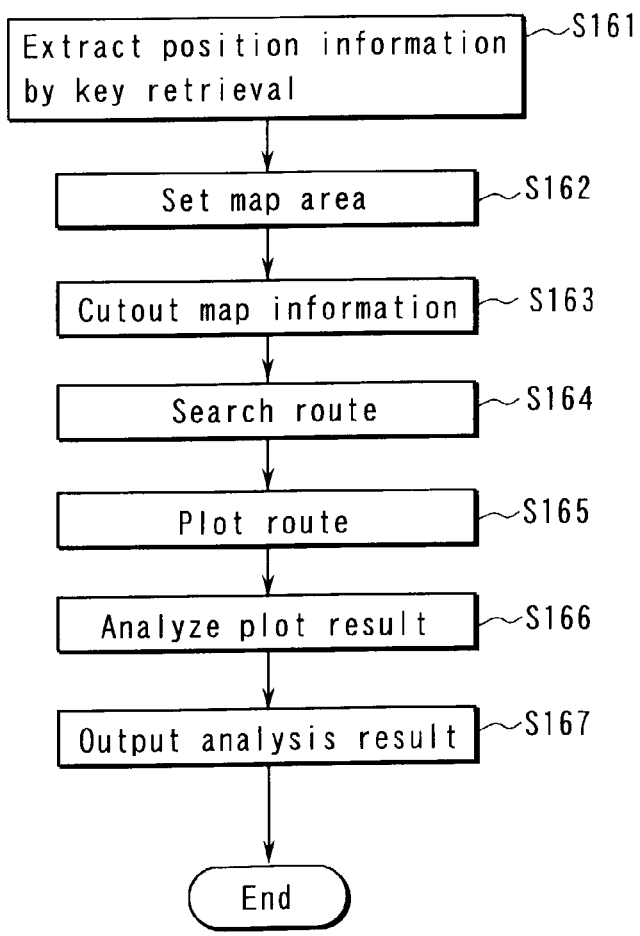
FIG. 16 is a flowchart which shows processing procedure in the sixth embodiment of the position information presentation device of the present invention.

Next, the position information presentation device according to the sixth embodiment of the present invention will be explained. Since the configuration to achieve the sixth embodiment is the same as that of the first embodiment, drawings and the explanation thereof will be omitted. In the sixth embodiment, by generating the path route to the place (Hereinafter, it is called, "Destination") associated with the information from the inspected point, the information in the line of pathroute, which is not one point information that the information is inspected, is output. FIG. 16 is a flowchart of the processing procedure in the sixth embodiment of the present invention.

First of all, the retrieval is performed to the data stored in the position associated information memory part 4, for instance, in which the shop name is as a retrieval key, the record referred to the name input as a key is extracted (step S161). Next, the range of the presentation in the map area which should be presented is selected (step S162). Here, it is judged, for instance, whether the destination is contained or not, and/or judged that it is presented by scaling down which extent.

Next, the necessary geography information for the path route search to the destination etc. is read from the map data memory part 7 according to the selected range of the presentation (step S163). And, the path route search to the destination is performed to all the read points (step S164). The search processing of this path will be described later.

Next, the position associated information presentation part plots the path route on the map as a result of the path search (step S165). At this time, the road or the intersection which exists on the road as shown in the path route is counted as an access point.

Next, the result of plotting is analyzed, and the point displayed in the presented map is selected (step S166). Specifically, it is assumed that the threshold is provided to the counted value, and the emphasis display etc. are performed to the roads or intersections which are counted more than this threshold. Moreover, it is also possible to calculate and display the percentage which passes the road and the intersection from all counted numbers.

As mentioned above, the map image which overlaps and displays in the map for the selected point, and contains completed position information is displayed on the screen such as PC (step S167). Or, the map image is delivered through the network. Though the road and the crossing intersection which pass to the destination are explained above, it can be achieved by replacing them as a railway and a station. Moreover, it can be presumed where the road, the intersection, and the station which pass on the way by reaching from the point to the destination where information is inspected at last are or the frequency of passing them.

Figure 17:
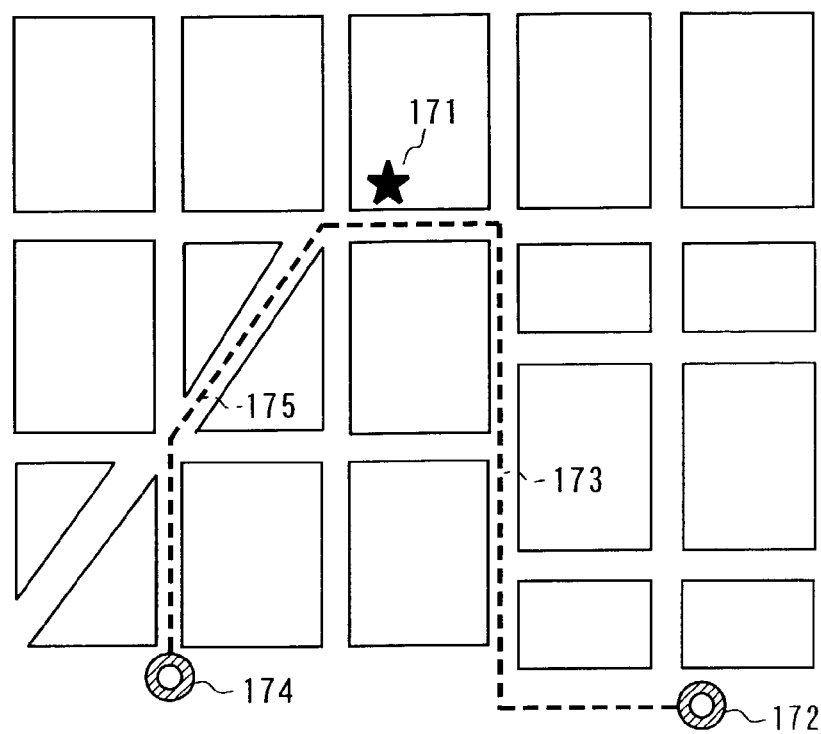
FIG. 17 is an explanation figure of the display screen in the position information presentation device according to the sixth embodiment of the present invention.

By the way, the processing of the path route search performed in step S164 in the sixth embodiment will be explained by using FIG. 17. The path route 173 is extracted by the path route search when inspected to the destination 171 in the point 172. The intersection and the road in this route path are counted in step S165. Similarly, the path route 175 is extracted by the path route search when inspected in the point 174. Dijkstra method known as a method of the shortest path problem etc. may be used by how to obtain this path (route).

Figure 18:
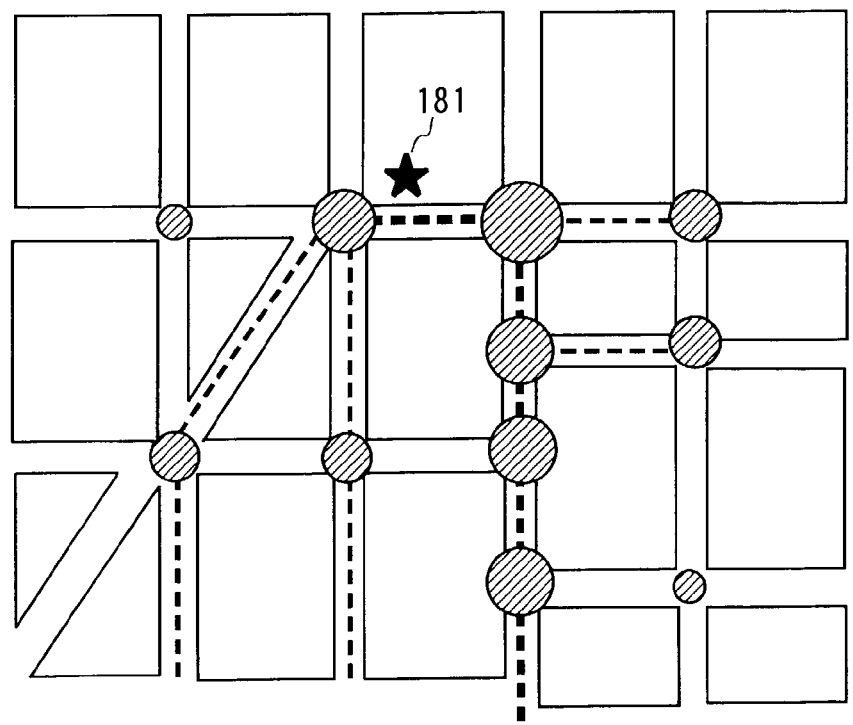
FIG. 18 is an explanation figure of the display screen in the position information presentation device according to the sixth embodiment of the present invention.

The intersection and the road in this path route are counted in step S165 processing. The result shown in FIG. 18 is presented as a result of the count. In FIG. 18, by the size of the circle about the intersection and the thickness about the road according to the counted value, which road and/or which intersection is passed to reach the destination 181 can be shown.

Figure 19:
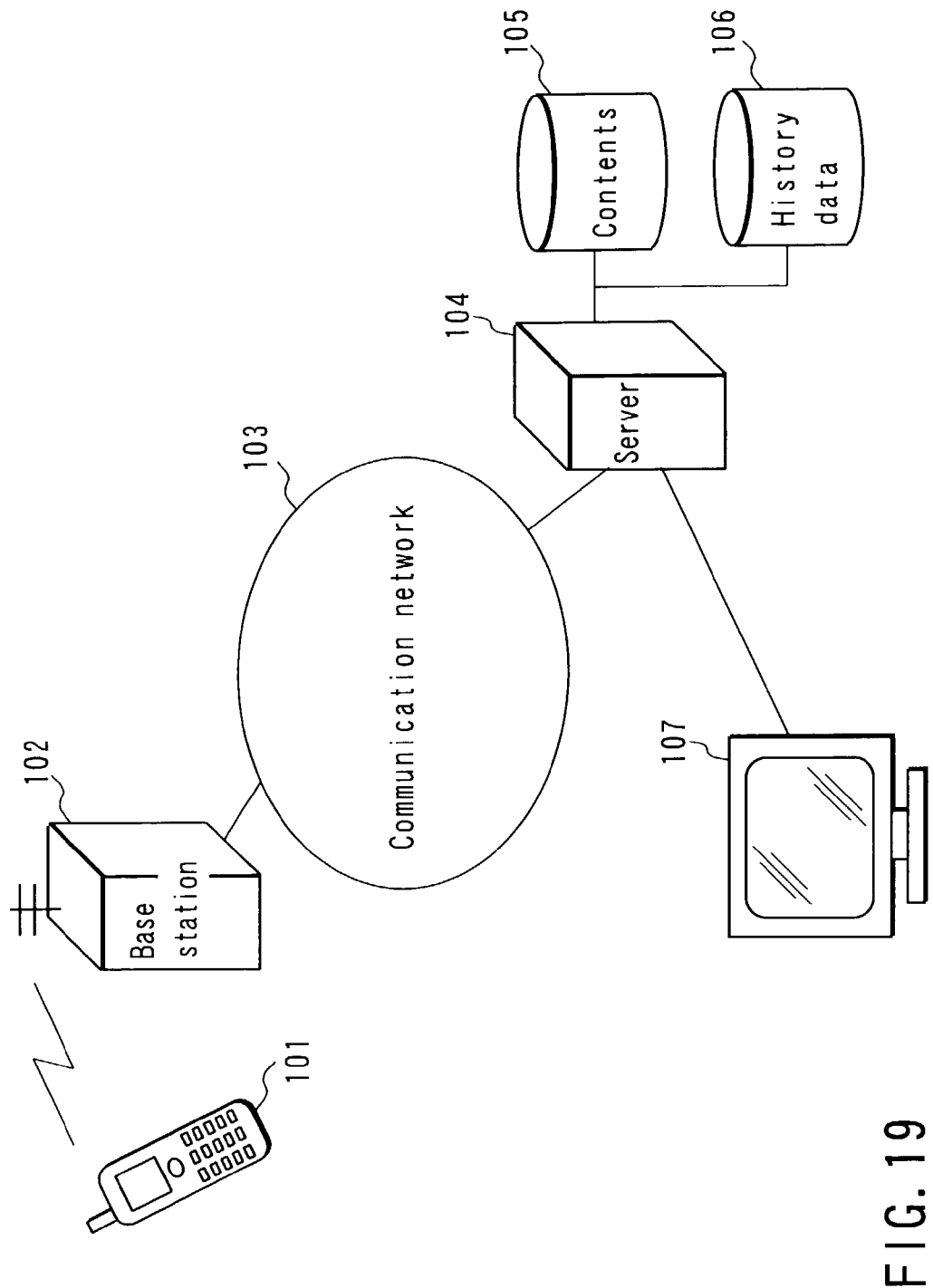
FIG. 19 is a configuration of the entire system figure in the first to sixth embodiments of the present invention according to the position information presentation device.

The mobile phone 101 with which the GPS function is equipped is assumed as a mobile terminal which can be achieved with the system as shown in FIG. 19 as each embodiment of the present invention which has been explained up to now. The instruction is transmitted to the server 104 in the inspection of information through the base station 102 and the communication network 103 of the mobile phone 101. And, the contents 105 where a lot of information is stored are retrieved.

The history information inspected like this and the latitude and longitude information etc. which is obtained by the position measurement function of the mobile phone 101 are sent to the server 104, and are stored in the file 106 as the history information. The stored history information 106 is analyzed with the server 105. The map and the graph which are analytical results by the console 107 which is the terminal for the control of the system can be confirmed.

Moreover, the processing according to the embodiments of the present invention can be achieved by a program executable by the computer and can be achieved as a storage medium where the program can be read with the computer.

As a storage medium in the present invention, the storage format may be in any forms, if there is a storage medium which can memorize the program, and can be read by the computer such as a magnetic disk, a floppy disk, a hard drive, and an optical disk (CD-ROM, CD-R, DVD) etc., a magnet-optical disk (MO etc.), and semiconductor memories, etc.

Moreover, the OS (operation system) which operates on the computer based on the instruction of the program installed from the storage medium to the computer, the database management software, and MW (middleware) in the network etc., etc. to achieve this embodiment may execute a part of each processing.

In addition, the storage medium in the present invention is not limited to a medium independent on the computer, a down-load the program transmitted down-loaded by the LAN or the Internet, etc., and the storage medium of the memory or the temporary memory may be included.

The storage medium is not limited to one medium, and a case of the processing in this embodiment is executed from two or more media is included in the storage medium in the present invention and the configuration of the medium may have any configurations.

The computer in the present invention executes each processing in this embodiment based on the program memorized in the storage medium, and may be any configurations such as the device which includes one device such as personal computers or the system in which two or more devices is connected with the network.

The computer in the present invention does not limit to the personal computer, but contains in the operation processor included in the information processing equipment and the microcomputer, etc., and calls the equipment which can achieve the function of the present invention by the program and the device, generically.

The following inventions can be extracted from each above-mentioned embodiment. The following inventions can be applied by combining properly or solely. It is possible to apply by properly changing within the scope of the invention.

A position information presentation device according to the first aspect of the present invention characterized by comprising: a position information acquisition part configured to acquire position information indicated by a latitude and longitude or an address on a portable terminal; an information inspection part configured to retrieve inspected information, and to present information in which inspection is requested for the portable terminal; a position associated information memory part configured to memorize a title or a content of information presented by the information inspection part as a position associated information by associating with the position information acquired by the position information acquisition part; a position associated information readout part configured to read the position associated information corresponding to information which should be presented from the position associated information memorized in the position associated information memory part as a key of the title or the content of the information; and a position associated information presentation part configured to present position information which is included in the position associated information read by the position associated information readout part as map information.

In the first aspect, the following manners are preferable.

(1) The position associated information memory part memorizes additional information when inspection request to the information inspection part as an attribute value in addition to the position associated information, and the position associated information presentation part classifies and presents position information which should be presented according to the attribute value added to the position associated information.

(2) A position associated information conversion part configured to convert position information included in the position associated information read by the position associated information readout part into a conversion value according to a selected predetermined index is further provided, and the position associated information presentation part presents the conversion value of the position information converted by the position associated information conversion part as map information.

(3) A search part configured to search path information at a point which becomes destination from position information which is included in the position associated information read by the position associated information readout part referring to map information is further provided, and the position associated information presentation part presents the path information searched by the search part.

A position information presentation device according to second aspect of the present invention characterized by comprising: a position information acquisition part configured to acquire position information indicated by a latitude and longitude or an address on a portable terminal; an information inspection part configured to retrieve inspected information, and to present information in which inspection is requested for the portable terminal; a history information memory part configured to memorize a title or a content of information presented by the information inspection part as history information by associating with position information acquired by the position information acquisition part; a history information readout part configured to read the history information corresponding to information which should be presented from the history information memorized in the history information memory part as a key of the title or the content of the information; and a presentation part configured to present position information which is included in the history information read by the history information readout part, and user's situation corresponding to the position information, as map information.

In the second aspect, it is preferable that a situation judgment part configured to judge user's situation based on position information and the map information, the position information acquired by the position information acquisition part is provided, and the history information memory part is associated with the user's situation judged by the situation judgment part and memorized as history information in addition to the title or the content of information presented by the information inspection part to position information acquired by the position information acquisition part.

In the first and second aspects, it is preferable that a map information memory part configured to memorize map information is further provided, and the position associated information presentation part displays the position information based on the map information memorized on the map information storage part.

A position information presentation method according to the third aspect of the present invention is characterized by comprising: acquiring position information indicated by a latitude and longitude or an address on a portable terminal; retrieving inspected information and presenting a title or a content of information in which inspection is requested for a portable terminal; associating with the acquired position information and memorizing a title or a content of presented information as a position associated information; reading the position associated information corresponding to information which should be presented from the position associated information memorized as a key of the title or the content of the information; and presenting position information which is included in the read position associated information includes as map information.

In the third aspect, it is preferable that converting position information included in the read position associated information into a conversion value according to a selected predetermined index is further provided, and presenting the associated information includes presenting the conversion value of the converted position information as map information. Or, it is preferable that searching path information at a point which becomes destination from position information which is included in the read position associated information referring to map information is further provided, and the searched path information is presented.

A position information presentation method according to the fourth aspect of the present invention is characterized by comprising: acquiring position information indicated by a latitude and longitude or an address on a portable terminal; retrieving information, and to present information in which inspection is requested for the portable terminal; associating with the acquired position information and memorizing a title or a content of presented information as history information; reading the history information corresponding to information which should be presented from the memorized history information as a key of the title or the content of the information; and presenting position information which is included in the read history information, and user's situation corresponding to the position information, as map information.

In the fourth method, it is preferable that judging user's situation based on the acquired position information and the map information is further provided, and memorizing as history information contains associating with the user's situation and memorizing as history information in addition to the title or the content of presented information to acquired position information.

A program executable by the computer according to the fifth aspect of the present invention is characterized by comprising: a function to acquire position information indicated by a latitude and longitude or an address on a portable terminal; a function to retrieve inspected information, and to present information in which inspection is requested for the portable terminal; a function to associate with the acquired position information and memorizes a title or a content of acquired information as a position associated information; a function to read the position associated information corresponding to information which should be presented from the memorized position associated information as a key of the title or the content of the information; and a function to present position information which is included in the read position associated information includes as map information.

In the fifth aspect, it is preferable a function to convert position information included in the read position associated information into a conversion value according to a selected predetermined index is further provided, and the conversion value of the converted position information is presented as map information. Or, a function to search path route information at a point which becomes destination from position information which is included in the read position associated information referring to map information is further provided, and the searched path route information is presented.

A program executable by the computer according to the sixth aspect of the present invention is characterized by comprising: a function to acquire position information indicated by a latitude and longitude or an address on a portable terminal; a function to retrieve inspected information, and to present information in which inspection is requested for the portable terminal; a function to associate with acquired position information and memorizes a title or a content of presented information as history information; a function to read the history information corresponding to information which should be presented from the memorized history information as a key of the title or the content of the information; and a function to present position information which is included in the read history information, and user's situation corresponding to the position information, as map information.

As explained above, according to the present invention, it becomes possible to immediately understand the information which place acquiring the place where a certain information is retrieved and inspected to be necessary.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A position information presentation device comprising:
    a position information acquisition part configured to acquire position information indicated by a latitude and longitude or an address on a portable terminal;
    an information inspection part configured to retrieve inspected information, and to present information in which inspection is requested by the portable terminal;
    a position associated information memory part configured to memorize history information of position information to which the presented information is inspected and which are associated with a title or a content of information presented by the information inspection part as a position associated information when the presented information is inspected;
    a position associated information readout part configured to read out desired history information from the position associated information memorized in the position associated information memory part by using the title or the content of the information; and
    a position information presentation part configured to present a plurality of position information items each of which is included in the desired position associated information read out by the position associated information readout part on a map.

2. The position information presentation device according to claim 1, further comprising:
    a map information memory part configured to memorize map information, wherein
    the position information presentation part displays the position information based on the map information memorized in the map information memory part.

3. The position information presentation device according to claim 1, wherein,
    the position associated information memory part memorizes additional information when inspection request to the information inspection part as an attribute value in addition to the position associated information, and
    the position information presentation part classifies and presents position information which should be presented according to the attribute value added to the position associated information.

4. The position information presentation device according to claim 3, further comprising:
    a map information memory part configured to memorize map information, wherein
    the position information presentation part displays the position information based on the map information memorized in the map information memory part.

5. The position information presentation device according to claim 1, further comprising:
    a position associated information conversion part configured to convert position information included in the position associated information read by the position associated information readout part into a conversion value according to a selected predetermined index, wherein
    the position information presentation part presents the conversion value of the position information converted by the position associated information conversion part on a map.

6. The position information presentation device according to claim 5, further comprising:
    a map information memory part configured to memorize map information, wherein
    the position information presentation part displays the position information based on the map information memorized on a map information memory part.

7. A position information presentation device comprising:
    a position information acquisition part configured to acquire position information indicated by a latitude and longitude or an address on a portable terminal;
    an information inspection part configured to retrieve inspected information, and to present information in which inspection is requested by the portable terminal;
    a history information memory part configured to memorize history information of position information to which the presented information is inspected and which are associated with a title or a content of information presented by the information inspection part when the presented information is inspected;

a history information readout part configured to read out desired history information from the history information memorized in the history information memory part by using the title or the content of the information; and a presentation part configured to present position information which is included in the desired history information read by the history information readout part, and a user's situation corresponding to the position information on a map.

8. The position information presentation device according to claim 7, further comprising:

a situation judgment part configured to judge the user's situation based on position information and the map information, the position information acquired by the position information acquisition part, wherein the history information memory part is associated with the user's situation judged by the situation judgment part and memorized as history information in addition to the title or the content of information presented by the information inspection part to position information acquired by the position information acquisition part.

9. The position information presentation device according to claim 7, further comprising:

a map information memory part configured to memorize map information, wherein the position information presentation part displays the position information based on the map information memorized in the map information memory part.

10. The position information presentation device according to claim 1, further comprising:

a search part configured to search path information at a point which becomes a destination from position information which is included in the position associated information read by the position associated information readout part referring to map information, wherein the position information presentation part presents the path information searched by the search part.

11. A position information presentation method comprising:

acquiring position information indicated by a latitude and longitude or an address on a portable terminal;

retrieving inspected information and presenting a title or a content of information in which inspection is requested by a portable terminal;

associating with the acquired position information and memorizing history information of position information to which the presented information is inspected and which are associated with a title or a content of presented information as a position associated information;

reading out desired history information from the position associated information memorized by using the title or the content of the information; and presenting position information which is included in the read position associated information on a map.

12. The position information presentation method according to claim 11, further comprising:

converting position information included in the read position associated information into a conversion value according to a selected predetermined index, wherein presenting the associated information includes presenting the conversion value of the converted position information as map information.

13. A position information presentation method comprising:

acquiring position information indicated by a latitude and longitude or an address on a portable terminal;

retrieving information and presenting information in which inspection is requested by the portable terminal;

associating with the acquired position information and memorizing history information of position information to which the presented information is inspected and which are associated with a title or a content of presented information and are associated with position information acquired when the presented information is inspected;

reading out desired history information from the memorized history information by using the title or the content of the information; and presenting position information which is included in the read history information, and user's situation corresponding to the position information, on a map.

14. The position information presentation method according to claim 13, further comprising:

judging user's situation based on the acquired position information and the map information, wherein memorizing as history information contains associating with the user's situation and memorizing as history information in addition to the title or the content of presented information to acquired position information.

15. The position information presentation method according to claim 11, further comprising:

searching path information at a point which becomes destination from position information which is included in the read position associated information referring to map information, wherein the searched path information is presented.

16. A computer readable medium including a program executable by a computer comprising:

a function for causing the computer to acquire position information indicated by a latitude and longitude or an address on a portable terminal;

a function to retrieve inspected information, and to present information in which inspection is requested by the portable terminal;

a function to associate with the acquired position information and memorize history information of position information to which the presented information is inspected and which are associated with a title or a content of acquired information as a position associated information when the presented information is inspected;

a function to read out desired position associated information from the memorized position associated information by using the title or the content of the information; and a function to present position information which is included in the read position associated information on a map.

17. The program according to claim 16, further comprising:

a function to convert position information included in the read position associated information into a conversion value according to a selected predetermined index, wherein the conversion value of the converted position information is presented as map information.

18. The program according to claim 16, further comprising:

a function to search path route information at a point which becomes a destination from position information which is included in the read position associated information referring to map information, wherein the searched path route information is presented.

19. A computer readable medium including a program executable by a computer comprising:
- a function for causing the computer to acquire position information indicated by a latitude and longitude or an address on a portable terminal;
- a function to retrieve inspected information, and to present information in which inspection is requested by the portable terminal;
- a function to associate with acquired position information and memorize history information of position information to which the presented information is inspected and which are associated with a title or a content of presented information when the presented information is inspected;
- a function to read out desired history information from the memorized history information by using the title or the content of the information; and
- a function to present position information which is included in the read history information, and user's situation corresponding to the position information on a map.

20. The position information presentation device according to claim 1, wherein the plurality of position information items are presented as distribution of positions concerning an accessed title or content.

21. The position information presentation device according to claim 5, wherein the position information presentation part presents the conversion value of the position information as statistical data.

* * * * *

UNITED STATES PATENT AND TRADEMARK OFFICE
CERTIFICATE OF CORRECTION

PATENT NO.        : 7,107,149 B2                                    Page 1 of 1
APPLICATION NO.   : 10/234112
DATED             : September 12, 2006
INVENTOR(S)       : Kubota It is certified that error appears in the above-identified patent and that said Letters Patent is hereby corrected as shown below:

\* Title page, insert --(74) *Attorney, Agent, or Firm*–Finnegan, Henderson, Farabow, Garrett & Dunner, L.L.P.--.

Title page, item (57), in the Abstract, change "memorize" to --memorizes--.

Claim 1, column 15, line 64, change "are" to --is--.

Claim 7, column 16, line 65, change "are" to --is--.

\* Claim 13, column 18, line 15, change "information, on" to --information on--.

Signed and Sealed this

Nineteenth Day of December, 2006

JON W. DUDAS
*Director of the United States Patent and Trademark Office*